(12) United States Patent  
Begola

(10) Patent No.: US 7,284,696 B2
(45) Date of Patent: Oct. 23, 2007

(54) CHANGE CARD

(76) Inventor: Jeffrey J. Begola, 8223 Wilson St., Philadelphia, PA (US) 19136

( * ) Notice: Subject to any disclaimer, the term of this patent is extended or adjusted under 35 U.S.C. 154(b) by 0 days.

(21) Appl. No.: 10/983,203

(22) Filed: Nov. 5, 2004

(65) Prior Publication Data

US 2006/0097039 A1  May 11, 2006

(51) Int. Cl.
*G06F 5/00* (2006.01)
(52) U.S. Cl. ............... 235/380; 235/379; 235/381; 705/14; 705/17; 705/38; 705/39; 283/101
(58) Field of Classification Search ........ 235/379–381, 235/375; 705/39, 17, 14, 38; 283/101
See application file for complete search history.

(56) References Cited

U.S. PATENT DOCUMENTS

| | | | |
|---|---|---|---|
| 3,818,187 A * | 6/1974 | Lovendusky et al. ....... 235/380 |
| 5,101,098 A | 3/1992 | Naito ......................... 235/475 |
| 5,649,118 A * | 7/1997 | Carlisle et al. .............. 705/41 |
| 5,650,761 A | 7/1997 | Gomm et al. ................ 235/381 |
| 5,753,899 A | 5/1998 | Gomm et al. ................ 235/381 |
| 5,869,826 A * | 2/1999 | Eleftheriou ................. 235/380 |
| 6,183,017 B1 * | 2/2001 | Najor et al. ................. 283/101 |
| 6,386,457 B1 | 5/2002 | Sorie .......................... 235/487 |
| 6,473,500 B1 | 10/2002 | Risafi et al. ............. 379/144.1 |
| 6,502,745 B1 | 1/2003 | Stimson et al. ............. 235/375 |
| 2003/0001005 A1 | 1/2003 | Risafi et al. ................. 235/380 |
| 2003/0040927 A1 | 2/2003 | Sato et al. ...................... 701/1 |
| 2003/0053609 A1 | 3/2003 | Risafi et al. ............. 379/114.2 |
| 2003/0092477 A1 | 5/2003 | Luciano, Jr. et al. ......... 463/16 |
| 2004/0155104 A1 | 8/2004 | Mitchell, Jr. |
| 2004/0169087 A1 * | 9/2004 | Lasch et al. ................. 235/493 |
| 2005/0015332 A1 * | 1/2005 | Chen ........................... 705/39 |
| 2005/0080198 A1 | 4/2005 | Doyle |
| 2005/0080720 A1 * | 4/2005 | Betz et al. .................... 705/38 |
| 2005/0080737 A1 | 4/2005 | Skin et al. |
| 2005/0102211 A1 * | 5/2005 | Freeny, Jr. ................... 705/35 |
| 2005/0246232 A1 | 11/2005 | Lambao et al. |
| 2006/0010068 A1 | 1/2006 | Haber |

FOREIGN PATENT DOCUMENTS

JP  4252395  9/1992
JP  8255282  10/1996

* cited by examiner

*Primary Examiner*—Michael G. Lee
*Assistant Examiner*—Allyson N Trail
(74) *Attorney, Agent, or Firm*—Drinker Biddle & Reath LLP

(57) ABSTRACT

A transaction card allows for retail purchases involving fractional dollar amounts to be completed without the use of coin currency. Change amounts involving less than one dollar can be either credited to or debited from a monetary value stored on a smart chip in the transaction card by placing the transaction card into a card reader that reads a magnetic swipe strip associated with the smart chip. Amounts credited to the transaction card can be used for secondary transactions not involving paper or coin currency.

19 Claims, 3 Drawing Sheets

CHANGE CARD

FIELD OF THE INVENTION

The present invention relates generally to the field of transaction cards, such as debit cards, wherein a monetary value is stored in a computer readable format, such as a magnetic swipe strip. More specifically, the present invention relates to a system and method for using a transaction card to replace the use of coinage in a variety of retail and other transactions.

BACKGROUND OF THE INVENTION

Many transactions engaged in by individuals on a daily basis involve using coin currency. Very rarely does a retail transaction involve a whole dollar amount, with no change in coins being exchanged. As a result, individuals are constantly either giving or receiving change in the form of heavy, bulky coins. Not only are coins heavy and bulky to carry, they are easily lost.

As a result, many individuals opt not to carry coins of any type; instead depositing the days accumulated change into a jar or bowl. This practice leads to the loss of significant value to an individual, since the value of change accumulated over the course of a week can easily amount to several dollars, and may be well over one hundred dollars over the course of a year.

One method to recapture this value is by rolling spare change and making a deposit at a local bank, or going to a coin counting machine. However, rolling change is time consuming, inaccurate and requires a minimum value of coins before it becomes worthwhile. Further, the use of coin counting machines usually involves a fee. In addition, the value of the coins is lost to the individual while waiting to obtain the critical mass necessary to make rolling the change or going to a coin machine worthwhile.

It would therefore be desirable to provide a system and method for eliminating the use of coin change in retail and other transactions. Such a system and method would be convenient and make the value of change readily available to be exploited.

SUMMARY OF THE INVENTION

The present invention provides a system and method for using a transaction card to replace the use of coinage in a variety of retail and other transactions wherein the purchase price of an item includes a fractional dollar amount. The present invention therefore provides a system and method for completing a transaction without the use of coins.

The method according to the current invention comprises providing a transaction card, which has a card body with a memory storage disposed on the card body. The memory storage is generally a smart chip incorporated into a magnetic swipe strip capable of being read by a card reader. The memory storage is used for storing an identification, generally and alpha-numeric code, for an account associated with the transaction card and a monetary value associated with the account, and therefore with the transaction card.

According to the method, when purchasing goods or services having a purchase price including a fractional dollar amount, a whole dollar amount in currency either above or below said purchase price is tendered, along with the transaction card. The difference between the purchase price and the whole dollar amount tendered is of course represented at least in part by a value in coins less than one dollar.

The value in coins less than one dollar is credited or debited from the transaction card account by inserting the transaction card into a first card reader. The first card reader reads the transaction card identification and the monetary value associated with the account associated with the card. An updated monetary value is created and associated with the transaction card and account by either crediting an overpayment credit to the monetary value, or debiting an underpayment debit from the monetary value via the card reader. The credit or debit will be at least the value in coins less than one dollar, but may be the entire difference between the purchase price and the whole dollar amount tendered.

In addition, the identification for the transaction card and the updated monetary value are stored in a memory storage in the first card reader. The data from one or more such transactions may then be transmitted, including the transaction card identification and updated monetary value from the memory storage in the first card reader to a central database. The data may then be erased from the memory storage in the first card reader. The central database may comprise a plurality of accounts, each of the accounts having an associated transaction card identification, and each reflecting a monetary value for the associated transaction card identification. The plurality of accounts may be updated periodically by receiving transmissions from at least one card reader having at least one transaction card identification and monetary value recorded therein.

In a preferred embodiment, the monetary value stored on the transaction card memory is available for secondary transactions that do not include the use of paper currency or coins. In such secondary transactions a total item purchase price is paid by passing the transaction card through a second card reader, thereby debiting the total item purchase price from the monetary value stored on the transaction card memory to generate an updated monetary value. Such transactions may be recorded in a memory storage in the second card reader. Such secondary transactions may be selected from the non-limiting examples of vending machines, parking meters, telephone services, public transportation fares, gaming/gambling machines, arcade games, juke boxes, pool tables, car washes/vacuums, toll booths, news paper boxes, copiers, laundromats, amusement rides, cyber cafes, cigarette machines, over-the-counter retail transactions and automatic teller machine (ATM) deposits.

DETAILED DESCRIPTION

The present invention provides a system and method for eliminating the need to use coinage in retail and other transactions.

The method uses a transaction card that is similar to traditional debit and credit cards. In general, the transaction card comprises a card body of plastic or other suitable material, with a memory storage disposed on the card body.

The memory storage comprises a smart chip embedded in a magnetic swipe strip for reading and writing data to the card. A transaction card identification and a monetary value are stored on the memory storage. The transaction card identification is associated with an account at a bank or other financial or commercial institution, which is the issuer of the card. Unlike a debit card, the transaction card is typically, although not necessarily issued with a zero balance.

Figure 1:
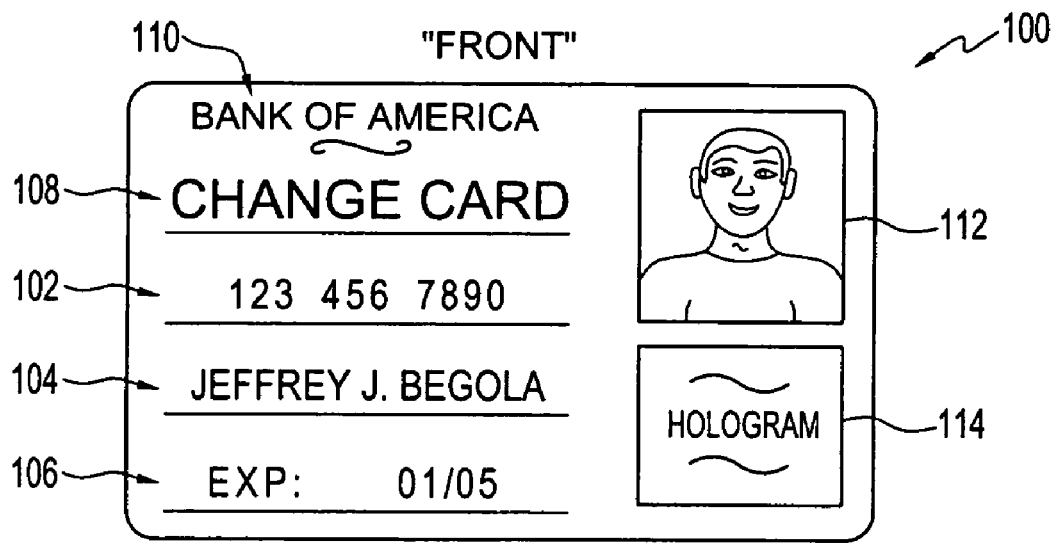
FIG. 1 Illustrates a frontal view of a transaction card according to the current invention.
Figure 2:
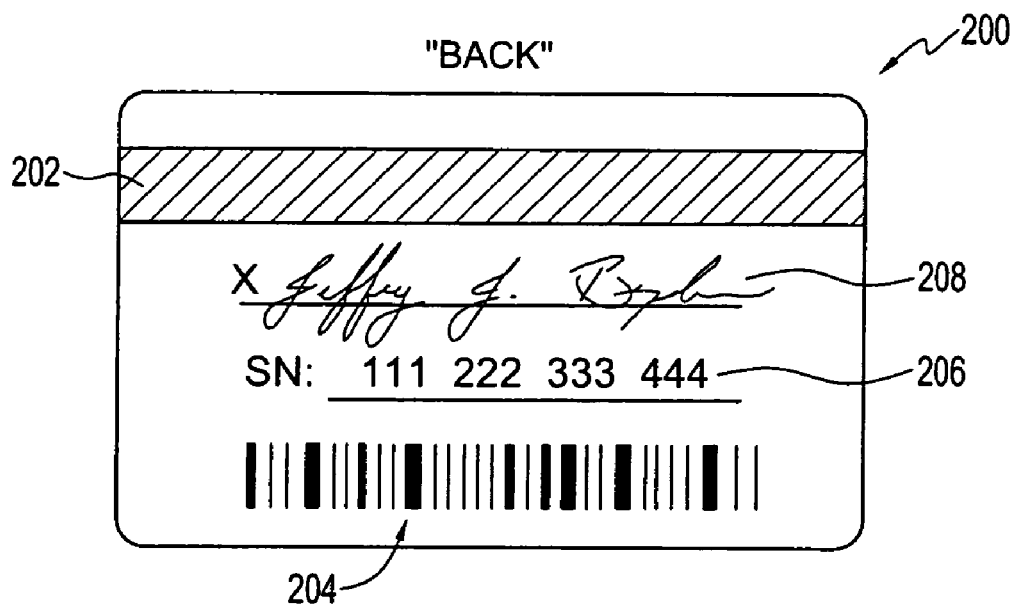
FIG. 2 Illustrates a rear view of a transaction card according to the current invention.

Referring to FIGS. 1 and 2, an exemplary transaction card according to the current invention is shown. FIG. 1 shows the front of an exemplary transaction card 100 according to the current invention. The front of the transaction card 100 may contain information about the transaction card, such as an alpha-numeric identification 102, the name of the cardholder 104, and an expiration date 106. In addition, the front of the transaction card 100 may contain information such as a title of the transaction card 108 and the name of the issuing institution 110. The front of the transaction card may also have security features such as a photograph of the cardholder 112 and a security hologram 114.

Referring to FIG. 2, the back of an exemplary transaction card 200 according to the current invention is illustrated. The back of the transaction card 200 preferably has the magnetic swipe strip 202 disposed thereon. A smart chip, not visible, is embedded in the magnetic swipe strip. In addition to the magnetic swipe strip 202 the back of the transaction card 200 may also have a UPC bar code 204 which contains the transaction card identification and can be related to the monetary value associated with the card. The UPC bar code can be used by the card issuer to recall the card identification and monetary value should the magnetic swipe strip become corrupt. The back of the transaction card 200 may also have an alpha-numeric production serial number 206 as a security feature and space for the card holder's signature 208 as an additional security feature.

Figure 3:
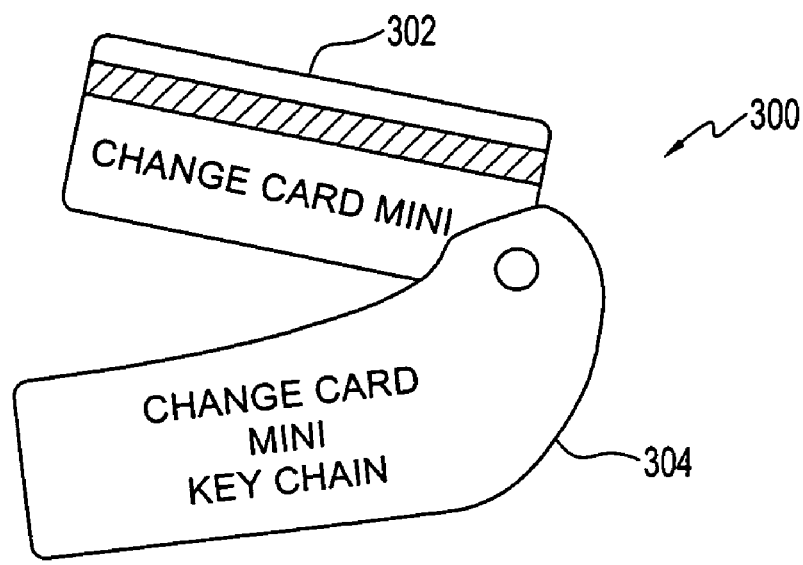
FIG. 3 Illustrates an alternative embodiment of a transaction card according to the current invention.

Referring to FIG. 3 an alternative embodiment of the transaction card 300 is shown. In this alternative embodiment, the transaction card body 302 is incorporated into a protective plastic sleeve 304. In this embodiment the transaction card can be attached to a cardholders key chain or other personal item.

Figure 4:
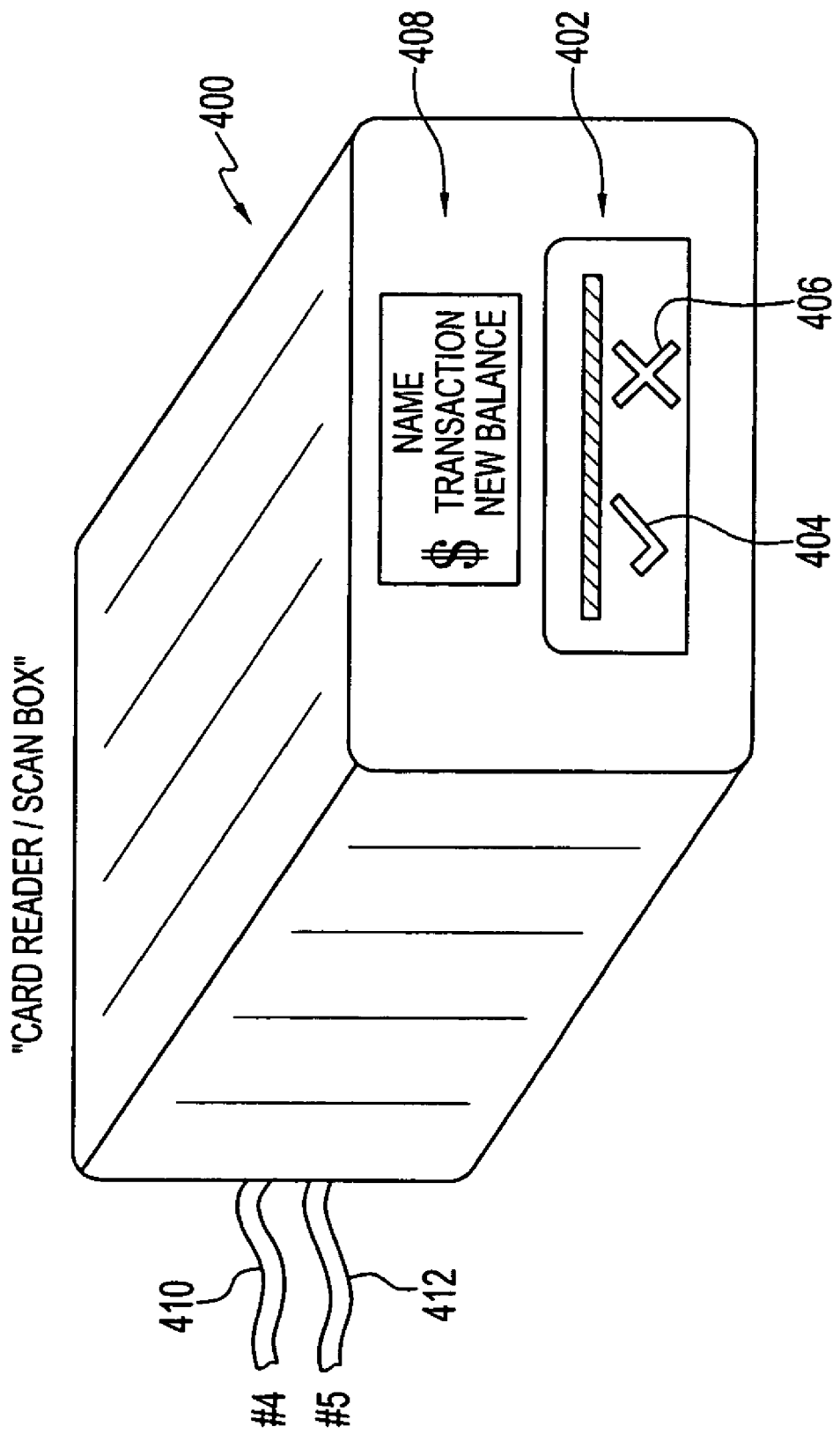
FIG. 4 Illustrates a card reader useful with the method according to the current invention.

Referring to FIG. 4, an exemplary card reader 400 useful with the current inventive method is illustrated. To perform a transaction the transaction card is inserted into slot 402. The card reader 400 is optionally equipped with indicators 404 and 406. In the exemplary embodiment shown in FIG. 4 the check mark (✓) indicator 404 indicates a successful card read. The (X) mark indicator 406 indicates an unsuccessful card read. The card reader 400 may also be equipped with an LED display 408. When the transaction card is inserted into the slot 402 the LED display may display such information as the cardholders name, the monetary value of the card before a transaction, the value of the transaction, and a new updated monetary value after the transaction is completed. The card reader 400 may also have a hard wire connection 410, such as a telephone line to communicate with a central database, and a hard wire connection 412 to a power source. It will be recognized that internal power sources and wireless connections are also within the scope of the present invention.

By way of example, the internal configuration of the card reader will comprise a magnetic strip reader/writer for updating the transaction card's memory, a card insertion and ejection mechanism, and a computer hard drive or other internal memory device for storing a record of all of the monetary values and card identifications from the day's transactions. The internal memory also stores the updated monetary value for each transaction card for which a transaction was processed on a given day. At regular intervals, such as at the end of each business day all of the data stored on the internal memory of the card reader is transmitted via telephone lines or other means to a central database.

The central database is maintained by the card issuer or an affiliate and contains a record of the alpha-numeric identification and associated monetary value for each card that it has issued. In addition, the database may contain information such as the name, address and telephone number of the cardholder, among other personal identifying information. The monetary value associated with the transaction card is updated on a periodic basis as data transmissions are received from the card readers at the various locations where transactions are completed. In a preferred embodiment, transmissions of data are made by the card readers and received by the central database on a daily basis, such as at the end of each business day. In another preferred embodiment, after a card reader has transmitted its stored data to the central database, the card reader internal memory is automatically erased to prepare for the next cycle of transactions.

This mode of operation, whereby transactions are stored rather than communicated to the central database on an individual basis speeds the transaction process since time is not spent contacting and communicating transaction information to and from the central database each time an individual transaction is completed. This produces a quicker transaction and also eliminates the difficulties that occur when communication with the central database cannot be established.

In standard retail settings the card reader can be placed adjacent to a cash register to permit convenient tendering of the transaction card by a cardholder. In an alternative embodiment the card reader may be placed in connection with or internal to a vending machine or other coin fed device. In this embodiment the entire transaction is completed without the use of paper or coin currency. The cardholder simply inserts the transaction card into the slot of the card reader and the entire purchase value of the goods or services purchased is deducted from the monetary value of the transaction card. Non-limiting examples of secondary transactions that can be completed in this way are, vending machines, parking meters, telephone services, public transportation fares, gaming/gambling machines, arcade games, juke boxes, pool tables, car washes/vacuums, toll booths, news paper boxes, copiers, laundromats, amusement rides, cyber cafes, cigarette machines, and over-the-counter retail transactions. In addition to retail purchases at coin fed machines, the transaction card can also be used to make bank account deposits, either over the counter or via ATMs.

Figure 5:
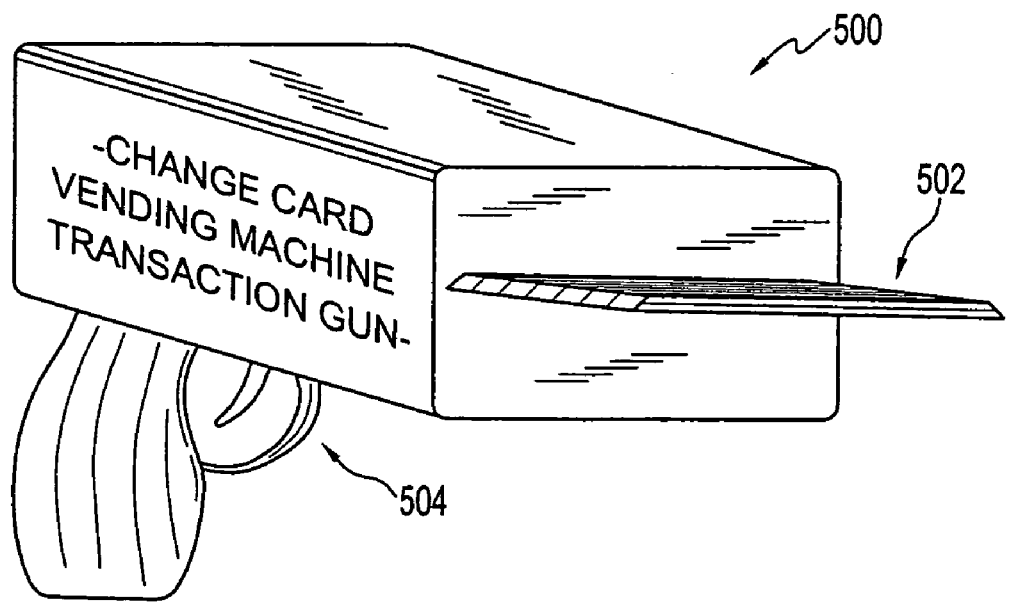
FIG. 5 Illustrates a scan box gun useful with the method according to the current invention.

In the case of coin fed vending machines and other transactions at coin fed machines the card reader may not be directly in communication with the central database. Rather, data for transactions will be stored in the internal card reader memory and will be manually emptied periodically by an attendant. In this embodiment, a device for downloading information from the internal card reader memory will be inserted into the card reader slot and the transaction data will be downloaded to the device. Referring to FIG. 5, in one embodiment the device comprises a scan box gun 500. A tongue element 502 on the scan box gun 500 is inserted into the card reader slot. By simply pulling the trigger 504 the data stored in the card reader internal memory will be able to be downloaded to an internal hard drive in the scan box gun 500.

As stated previously, the monetary value associated with the transaction card will be stored in the card's memory storage. In a preferred embodiment, the monetary value will be stored and expressed in 1 cent increments without the use of decimals, wherein 1 bit of information is equal to 1 cent. For example, a stored value of 000025 bits would be equal to 25 cents or $0.25. A stored value of 000235 bits would be equal to 235 cents or $2.35.

The method according to the current invention will now be further explained by way of non-limiting example. A new transaction card having an identification code 123456 is issued to an individual cardholder. Initially the transaction card has a monetary value of $0.00, which is recorded in the card memory as 000000. In addition, an account is set up in a central database, which is administered by the financial or commercial institution that issued the card. The account in the central database contains the transaction card identification 123456, as well as the initial monetary value of 000000. The account may, and preferably does contain additional personal information about the cardholder.

When the cardholder makes a purchase that includes a fractional dollar amount, such as purchasing a pack of gum for $0.25, the cardholder tenders $1.00 cash in payment and the transaction card. In lieu of receiving $0.75 in coins as change, the merchant inserts the transaction card into the card reader and credits $0.75 to the transaction card. The card now has a stored monetary value of 000075. In addition to crediting $0.75 to the transaction card, the card reader stores the card identification, the initial 000000 monetary value and the 000075 updated monetary value on its internal memory.

If the cardholder makes a second purchase, say $1.15 for a cup of coffee, the cardholder tenders $2.00 cash in payment, along with the transaction card. The $0.85 in change is credited to the card in lieu of coins, giving the transaction card a new updated monetary value of 000160, or $1.60. Again, the card reader stores the card identification, the initial 000075 monetary value and the 000160 updated monetary value.

A third transaction may involve purchasing a tube of toothpaste, for $2.25. In this case, the cardholder may choose to tender $2.00 in cash, along with the transaction card. In this case, 000025, or $0.25 would be debited from the stored monetary value, giving a new updated monetary value of 000135. Again, the card reader stores the card identification, the initial 000160 monetary value and the 000135 updated monetary value.

At the end of the business day, all three of these transactions are forwarded to the central database and the account for the transaction card is updated to reflect the three transactions.

In one embodiment, where the difference between an item purchase value and the amount tendered includes both fractional and whole dollar amounts, the entire difference may be either credited to or debited from the monetary value stored on the transaction card. For example, if an individual purchases an item with a purchase value of $8.50, the individual may tender $10.00 along with the transaction card. In this case the entire $1.50 in change could be credited to the transaction card.

The monetary value stored in the transaction card memory is also available for secondary transactions, wherein the entire purchase price is debited from the monetary value of the transaction card. Alternatively, all or a portion of the monetary value can be deposited to a bank account via an ATM or over the counter transaction.

The invention has thus been described with reference to exemplary drawings and other non-limiting examples. It will be apparent to those of ordinary skill in the art that other variations of the invention may be made without departing from the spirit and scope of the invention.

What is claimed is:

1. A method for completing transactions without the use of coins, the method comprising:
   providing a transaction card comprising a card body and a memory storage disposed on said card body, said memory storage comprising a smart chip and a magnetic swipe strip capable of being read by a card reader, said memory storage storing an identification for said transaction card and a monetary value for said transaction card; said transaction card being associated with an account at a financial or commercial institution via said identification;
   making at least one first purchase of goods or services having a first purchase price including a factional dollar amount;
   tendering a first whole dollar amount in currency above said first purchase price, wherein a difference between said first purchase price and the first whole dollar amount tendered is represented at least in part by a first value in coins less than one dollar;
   inserting said transaction card into a first card reader, said first card reader reading said transaction card identification and said monetary value;
   increasing said monetary value by crediting an overpayment credit to said monetary value, via said card reader, said overpayment credit being at least said first value in coins less than one dollar; and
   recording said identification for said transaction card and said monetary value following said first purchase in a memory storage in said first card reader and
   transmitting said transaction card identification and said monetary value from said memory storage in said first card reader to a central database; and
   erasing said transaction card identification and said monetary value from said memory storage in said first card reader.

2. The method according to claim 1, further comprising:
   making at least one second purchase of goods or services having a second purchase price including a second fractional dollar amount;
   tendering a second whole dollar amount in currency below said second purchase price, wherein a difference between said second purchase price and the second whole dollar amount tendered is represented at least in part by a second value in coins less than one dollar;
   inserting said transaction card into a second card reader, said second card reader reading said transaction card identification and said monetary value;
   decreasing said monetary value by debiting an underpayment debit from said monetary value via said second card reader, said underpayment debit being at least said second value in coins less than one dollar; and
   recording said identification for said transaction card and said monetary value following said second purchase in a memory storage in said second card reader.

3. The method according to claim 2, wherein:
   said transmitting and erasing occurs on a once daily basis.

4. The method according to claim 2, wherein,
   said central database comprises a plurality of accounts, each of said accounts having an associated transaction card identification, each of said plurality of accounts reflecting a monetary value for said associated transaction card identification,
   said plurality of accounts being updated periodically by receiving transmissions from at least one card reader having at least one transaction card identification and monetary value recorded therein.

5. The method according to claim 2, wherein:
said transaction card is provided with a zero initial monetary value.

6. The method according to claim 2, wherein:
said monetary value is available for a secondary transaction wherein a total item purchase price is paid by passing said transaction card through a third card reader, thereby debiting said total item purchase price from said monetary value monetary value, said monetary value following said secondary transaction and said transaction card identification being recorded by said third card reader in a memory storage.

7. The method according to claim 6, further comprising:
retrieving said monetary value and said transaction card identification recorded by said third card reader by inserting a retrieval device into said third card reader.

8. The method according to claim 7, further comprising:
erasing said monetary value and said transaction card identification from said third card reader after said retrieving.

9. The method according to claim 7, wherein said retrieval device comprises a scan box gun, and said updated monetary value and transaction card identification are upload from said scan box gun to a central database.

10. The method of claim 6, wherein,
said secondary transaction is selected from the group consisting of: vending machines, parking meters, telephone services, public transportation fares, gaming/gambling machines, arcade games, juke boxes, pool tables, car washes/vacuums, toll booths, news paper boxes, copiers, laundromats, amusement rides, cyber cafes, cigarette machines, over-the-counter retail transactions, and bank and ATM deposits.

11. The method according to claim 2, wherein
said monetary value is stored on said memory storage as a plurality of bits of information, wherein one bit of information corresponds to a monetary value of $0.01.

12. The method according to claim 2, wherein:
said transaction card further comprises a UPC scan strip disposed on said card body, said UPC scan strip recording said transaction card identification.

13. The method according to claim 2, wherein:
said transaction card further comprises at least one feature selected from the group consisting of: a photo of a transaction card holder, a hologram security feature, a financial institution name, a transaction card title, said transaction card identification, the name of a transaction card holder, an expiration date, a card holder signature, and a transaction card production serial number.

14. The method according to claim 2, wherein:
said transaction card is incorporated into a protective sleeve.

15. The method according to claim 1, wherein:
said monetary value is available for a secondary transaction wherein a total item purchase price is paid by passing said transaction card through a third card reader, thereby debiting said total item purchase price from said monetary value, said monetary value following said secondary transaction and said transaction card identification being recorded by said third card reader in a memory storage.

16. The method of claim 15, wherein,
said secondary transaction is selected from the group consisting of: vending machines, parking meters, telephone services, public transportation fares, gaming/gambling machines, arcade games, juke boxes, pool tables, car washes/vacuums, toll booths, news paper boxes, copiers, laundromats, amusement rides, cyber cafes, cigarette machines, over-the-counter retail transactions, and bank and ATM deposits.

17. A method for completing transactions without the use of coins, the method comprising:
providing a transaction card comprising a memory storage for storing an identification for said transaction card and a monetary value for said transaction card;
said transaction card being associated with an account in a central database at a financial or commercial institution via said identification;
making at least one first purchase of goods or services having a first purchase price including a first fractional dollar amount;
tendering a first whole dollar amount in currency above said first purchase price, wherein the difference between said first purchase price and the first whole dollar amount tendered is represented at least in part by a first value in coins less than one dollar;
reading said transaction card identification and said monetary value via a first card reader;
increasing said monetary value stored in said card memory by crediting an overpayment credit to said monetary value via said card reader, said overpayment credit being at least said first value in coins less than one dollar;
recording said identification for said transaction card and said monetary value following said first transaction in a memory storage in said first card reader, and
transmitting said transaction card identification and said monetary value from said memory storage in said first card reader to said central database, and erasing said transaction card identification and said monetary value from said memory storage in said first card reader;
making at least one second purchase of goods or services having a second purchase price including a fractional dollar amount;
tendering a second whole dollar amount in currency below said second purchase price, wherein the difference between said second purchase price and the second whole dollar amount tendered is represented at least in part by a second value in coins less than one dollar;
reading said transaction card identification and said monetary value via a second card reader;
decreasing said monetary value by debiting an underpayment debit from said monetary value via said second card reader, said underpayment debit being at least said second value in coins less than one dollar; and
recording said identification for said transaction card and said monetary value following said second transaction in a memory storage in said second card reader;
transmitting said transaction card identification and said monetary value from said memory storage in said second card reader to said central database; and erasing said transaction card identification and said monetary value from said memory storage in said second card reader.

18. The method according to claim 17, wherein,
said central database comprises a plurality of accounts, each of said accounts having an associated transaction card identification, each of said plurality of accounts reflecting a monetary value for said associated transaction card identification, said plurality of accounts being updated periodically by receiving transmissions from at least one card reader having at least one transaction card identification and monetary value recorded therein.

19. The method according to claim 17, wherein:
said monetary value is available for a secondary transaction wherein a total item purchase price is paid via a third card reader debiting said total item purchase price from said monetary value, said monetary value following said secondary transaction and said transaction card identification being recorded by said third card reader in a memory storage associated with said third card reader.

* * * * *